Dec. 17, 1968     L. J. MANDEL ET AL     3,417,308

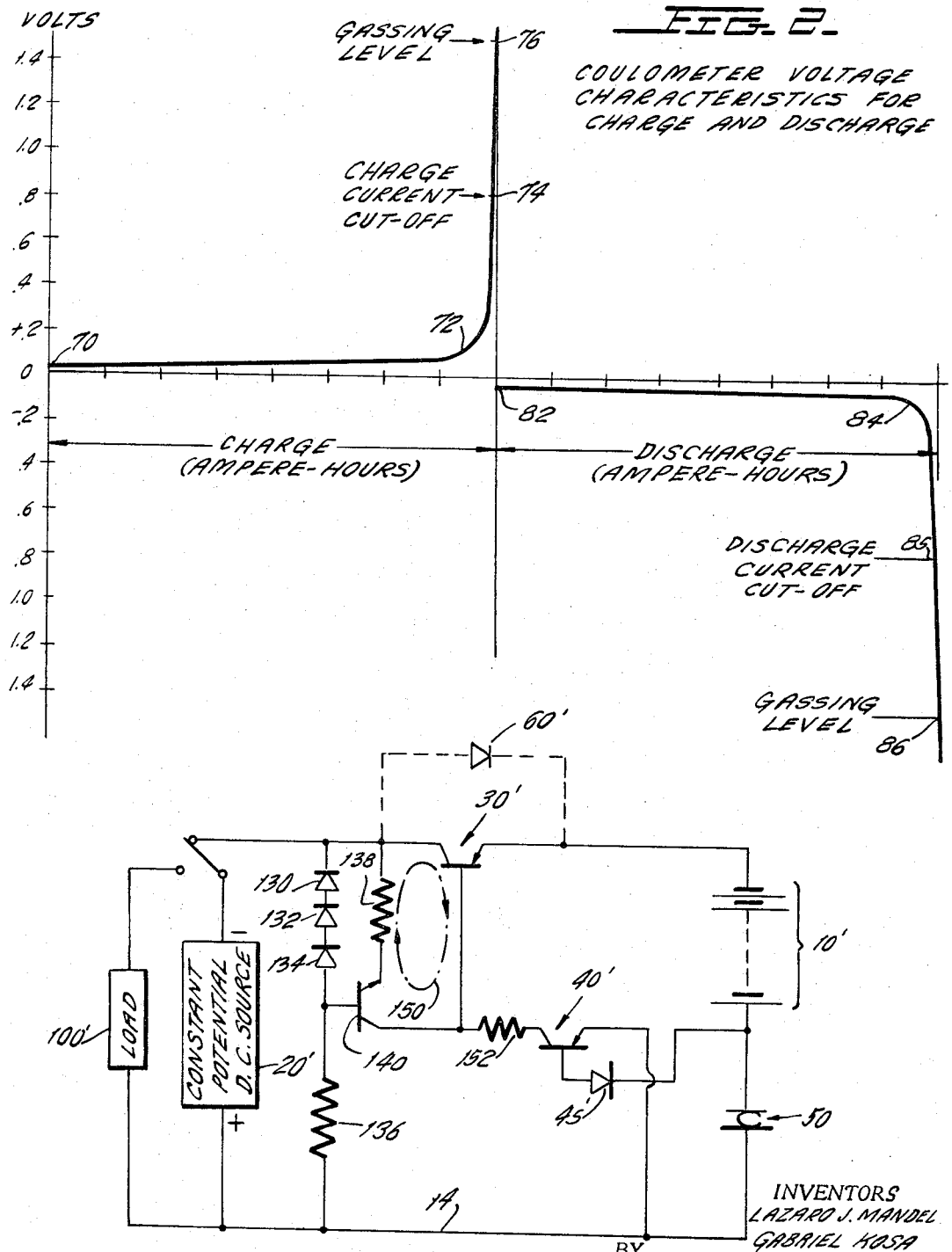

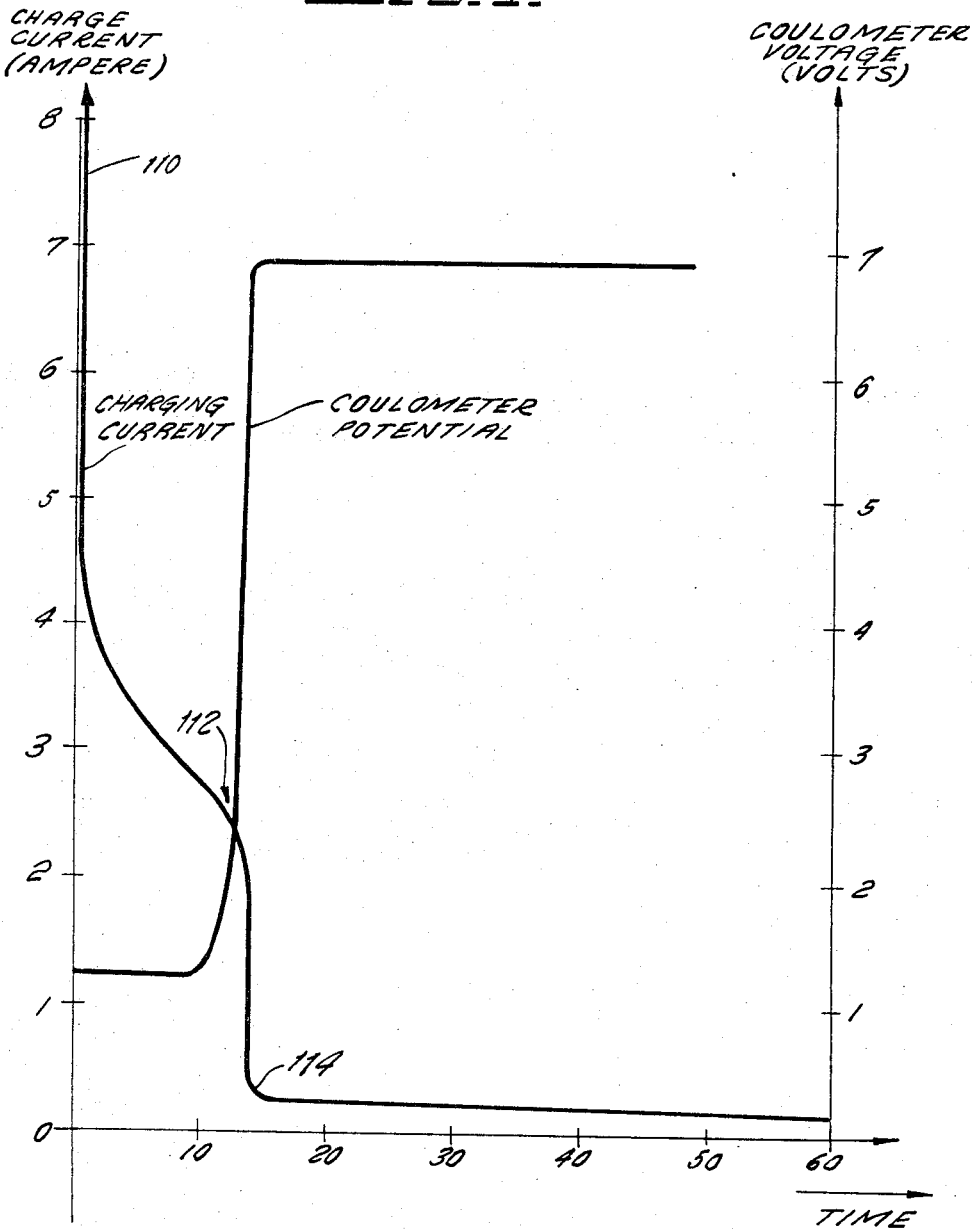

DUAL RATE BATTERY CHARGING SYSTEM

Filed Feb. 14, 1966     4 Sheets-Sheet 4

INVENTORS
LAZARO J. MANDEL
GABRIEL KOSA

BY OSTROLENK, FABER, GERB & SOFFEN
ATTORNEYS

United States Patent Office

3,417,308
Patented Dec. 17, 1968

3,417,308
DUAL RATE BATTERY CHARGING SYSTEM
Lazaro J. Mandel, Rego Park, and Gabriel Kosa, White Plains, N.Y., assignors to Sonotone Corporation, Elmsford, N.Y., a corporation of New York
Filed Feb. 14, 1966, Ser. No. 527,275
13 Claims. (Cl. 320—23)

ABSTRACT OF THE DISCLOSURE

A system for controlling the charge of a battery from a constant potential source, which includes an electronic circuit to: (a) provide an initial charge at a high rate; and (b) followed by an appreciably lower rate after a predetermined measured quantity of charge input has been delivered to the battery. The charge is measured by a coulometer which is connected in series between the charging source and the battery.

---

Our invention relates to a system for safely and reliably charging a battery from a constant potential charging source, and more particularly to such a system which controls the rate of charge in accordance with a measurement of the actual charge input to the battery.

Although it has other applications, the charging system of our invention has shown particular utility in recharging sealed nickel cadmium battery cells of the general type which are summarized in copending U.S. patent application entitled, "Third Electrode Rechargeable Alkaline Battery Cells and Associated Battery Circuits," Ser. No. 373,216, filed June 8, 1964, in the name of David Yehiely, and assigned to the assignee of the instant invention now abandoned.

When recharging such sealed battery cells, appropriate precautions must be taken in order to avoid overcharging which results in the excessive accumulation of gases. Otherwise, the accumulation of gases can result in a severe pressure build-up of sufficient magnitude to produce explosive rupture of the battery container. In order to avoid the danger of such overcharge, it is the present conventional practice to recharge such sealed battery cells from a constant current source at a fairly low charging rate; e.g., typically one-tenth the ampere hour capacity of the battery cell assembly. As can well be appreciated, such constant current charge circuits oftentimes require an excessive period of time to bring the depleted battery assembly back to its full charge capacity.

Further, in many applications a constant current charging source is not readily available. As for example, in aircraft, only a relatively low voltage source of power is available (e.g., 28 volts). Such a source cannot readily be converted into a constant current source having the power capabilities required to recharge the typical aircraft battery cell assembly. Because of the difficulties in providing a constant current charging source in such environments, it has become the practice to utilize vented battery cells. Such vented batteries may readily be charged from conventional types of constant potential charging sources without experiencing the dangers associated with excessive pressure build-up. However, the utilization of such vented cells creates numerous maintenance problems, such as the need to constantly replace the evaporated electrolyte. Advantageously, these problems are avoided by our invention, which permits the utilization of sealed cells in conjunction with a constant potential charging source.

One of the principal factors previously limiting the utilization of constant potential charging sources for sealed battery cells has been the thermal characteristics of such cells, which result in what has been termed "thermal runaway." More specifically, in the conventionally practiced systems of constant potential charging, the charging current is determined by the difference in potential between the input source and the battery, as well as the internal resistance of the battery. Thus, as the battery is increasingly charged, its potential should be expected to increase and hence decrease the input charging current. However, as is well known, such sealed battery cells also exhibit an inverse relationship between cell potential and cell temperature. Thus, as the cell becomes heated up during charge, which heating up may be excessive should there be a high in-rush current, the battery will experience a decrease in terminal voltage. Such decrease in terminal voltage serves to further increase the charging current magnitude, thereby further serving to heat up the battery and hence serving to effect a still further decrease of cell potential. This chain reaction oftentimes results in severe overcharge of the battery, evolving excess gases within the cell, thereby creating a dangerous condition and even explosive destruction of the cell itself.

Another problem which has limited the utilization of constant potential charging in the past results from individual cell unbalance within the battery assembly. In the previous charging systems which control the charging current in accordance with cell potential, the control voltage has generally been that which is obtained across the entire battery assembly. However, in a battery consisting of a number of individual cells in series, there is oftentimes a sufficient variation in the voltage condition of cell-to-cell to warrant extreme caution in the use of this method for the determination of the time at which the battery is fully charged.

Recognizing the difficulties of controlling a constant potential charging circuit in accordance with the potential of the battery assembly, our invention advantageously controls the charge current in accordance with an actual measurement of the quantity of charge delivered to the battery assembly. More specifically, the charging circuit of our invention includes a charge totalizing means, such as a coulometer, which may be of a known type, such as described in U.S. patent application Ser. No. 373,217 filed June 8, 1964, in the name of David Yehiely, entitled "Sealed Electro-Chemical Coulometer Cells," and assigned to the assignee of the instant invention, now abandoned. The coulometer is circuit connected in the charging path of the battery and the constant potential source, such that it receives an electrical charge input from the source quantitatively related to the quantity of electrical charge input delivered by the source to the battery. The coulometer is characterized as providing an electrical signal output when the charge input presented thereto reaches a predetermined quantity in accordance with the coulometer construction. The coulometer utilized is system-coordinated with the desired charge capacity of the cell, such that the charge input which must be presented thereto to provide the electrical signal output is operatively related to a predeterminedly selected charge input to the battery.

The charging circuit further includes electric circuit means which respond to the electrical signal output of the coulometer for reducing the rate of the input charge provided by the constant potential source to a value which may safely be provided to the battery for a prolonged duration. Hence, the battery will receive an initial charge from the constant potential source at a first rate and upon the occurrence of the coulometer output signal will thereafter receive a charge at an appreciably reduced rate, with the switching between the first and second rates being responsive to the charge input of the battery, as determined by the charge condition of the coulometer. That is, the control of the charging current provided by the constant potential source is determined by the amount of charge passed through the battery, rather than the potential of the battery.

In accordance with an illustrated form of our invention, the charging circuit includes a first and a second charging path through the emitter-to-collector junction of a first and second transistor respectively. The electrical signal output of the coulometer is circuit connected to the first and second transistors, such that the first transistor will be in its appreciable conducting state, and the second transistor will be cut off prior to the coulometer presenting its electrical output signal indicative of the battery having reached a predeterminedly selected charged condition. Hence, the charging current path will be through the first transistor. When the condition of the battery is such that the coulometer presents is electrical signal output, the first transistor will then be switched to its cut off state, as the second transistor is switched to its appreciable conducting state. Hence, the charging circuit to the battery will be through the second charging path, including the second transistor emitter-to-collector junction. However, the second charging current path also includes a current limiting device, such as a resistor of a sufficient magnitude to limit the charge current through the second path to a safe value which may be presented to the battery for a sustained period of time. Such safe value may, for example, be one-tenth the ampere hour capacity of the battery, e.g., the value typically provided for constant current charging. Hence, it is seen that our invention permits a fairly rapid charge rate of the battery assembly from the constant potential source, until the battery reaches a predetermined charge capacity (as contrasted to the voltage sensing means of the prior art), and then reduces the charging rate to a safe value, of a magnitude insufficient to cause excessive battery overcharge.

In order to permit cyclic operation of the battery assembly, it is desirous that the discharge path for the battery into its external load includes the coulometer device, circuit-connected in a manner such that the current flow therethrough during battery discharge is opposite to the current flow therethrough during battery charge. Hence, the coulometer will have a charge condition vary in accordance with the battery charge condition. It is known, however, that the coulometer device generally will have a higher charge-discharge efficiency than the battery. In order to compensate for this efficiency difference, the charging path of the battery in accordance with another aspect of our invention may have a circuit means for bypassing a predetermined portion of the charging current from the coulometer.

In accordance with another feature of our invention, the charging circuit may include a protective circuit means for controlling the magnitude of the initial charging current in the event of variations in the magnitude of the constant potential source, or serious cell inbalance occurring if one of the battery cells is shorted or otherwise damaged. This protective circuit means may typically take the form of an additional control transistor, in the base circuit of the first transistor.

It is therefore seen that a principal object of our invention resides in a system for safely recharging a battery assembly from a constant potential source.

A further object of our invention resides in a control circuit for the charging of a battery assembly from a constant potential source, in which the charging current is controlled in accordance with the quantitative electrical input to the battery.

Another object of our invention is to provide such a control circuit including a charge totalizing means in the electrical charging path of the battery, and characterized as presenting an electrical signal output when the charge input presented thereto reaches a predetermined quantity, operatively related to a predeterminedly selected charge input to the battery.

An additional object of our invention is to provide a charge-discharge control circuit for a sealed nickel cadmium battery assembly, in which the charging current magnitude is controlled in accordance with a quantitative measurement of the input charge to the battery.

Still a further object of our invention is to provide such a charge-recharge control circuit in which such quantitative measurement is obtained by an electrochemical coulometer device, series-circuit connected to the battery during the charging and discharge operation thereof, such that it will have a charge condition varying in accordance with the battery charge condition.

Still another object of our invention is to provide such a charge-discharge control circuit including circuit means for compensating between the difference of efficiency between the coulometer and the battery.

Still an adidtional object of our invention is to provide an electronically controlled charging circuit for safely charging a sealed battery assembly from a constant potential source, in which the charge responsive electrical output signal from a coulometer device serves as a transistor switching signal to achieve current limiting action.

These as well as other objects of our invention will be readily apparent upon a consideration of the following description and drawings in which:

FIG. 2 represents the characteristics of the type of coulometer device which may be utilized in conjunction with the practice of our invention.

Figure 1:
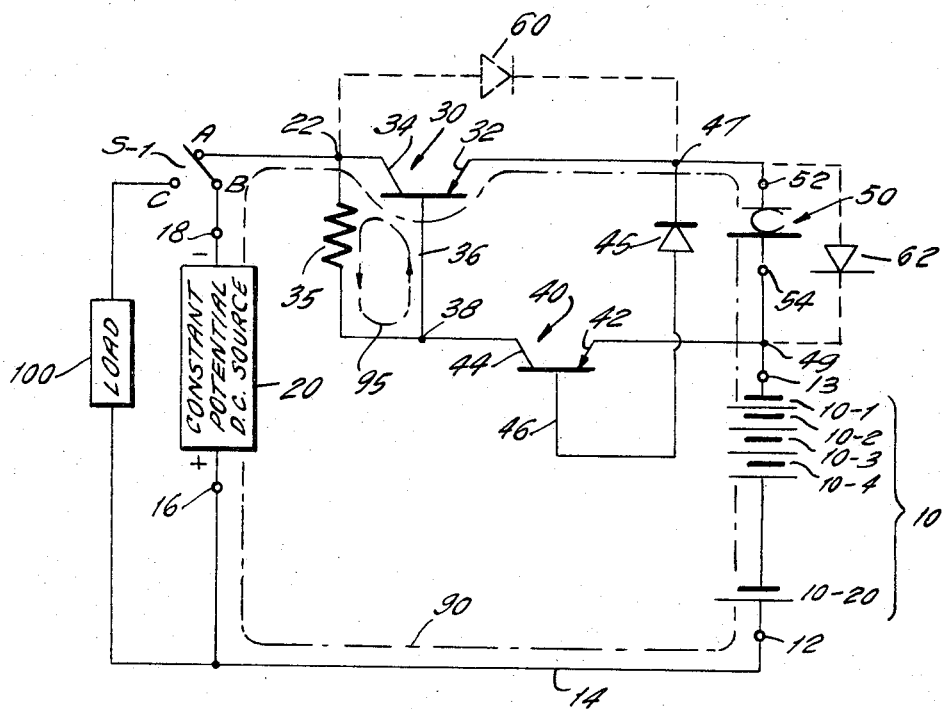
FIG. 1 is a circuit diagram showing one form of our invention and depicting the charging current path during the initial period of battery charge.
Figure 3:
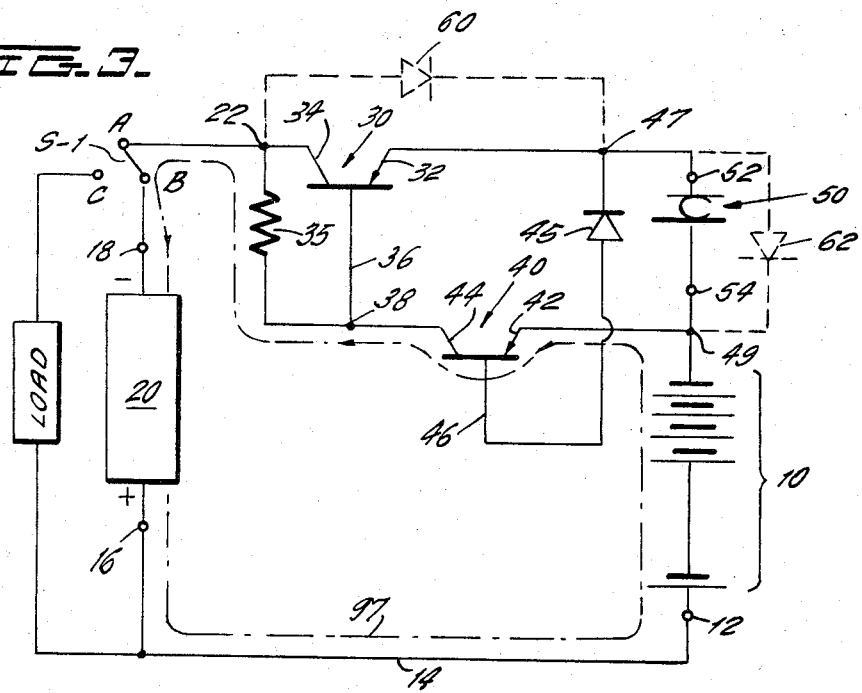
FIG. 3 shows the circuit of FIG. 1 with the charging current path corresponding to the battery having reached a predeterminedly selected charge capacity as determined by the coulometer condition.

FIG. 4 graphically represents the manner in which the charging current of the circuit shown in FIGS. 1 and 3 is controlled in accordance with the coulometer condition.

Figure 5:
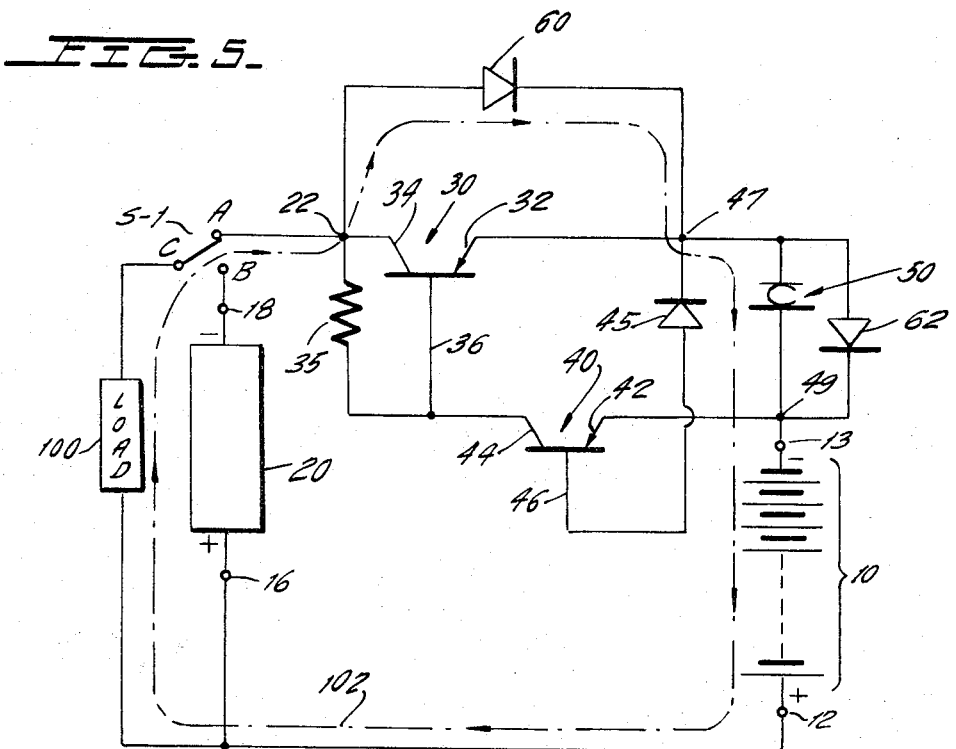

FIG. 5 illustrates the battery discharge mode of operation.

Figure 6:
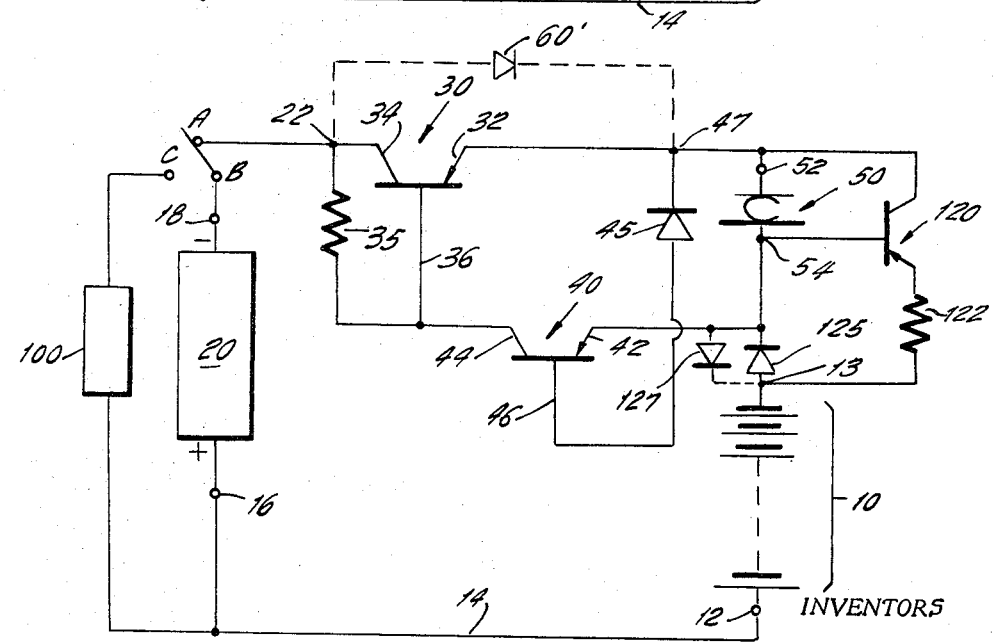

FIG. 6 shows a modified circuit configuration in accordance with our invention, which includes a coulometer bypass circuit to compensate for the difference in efficiency between the coulometer and battery.

FIG. 7 is a circuit diagram illustrating a further feature which may be added to our invention to protectively control the charging current responsive to an increase of source potential magnitude or a serious condition of cell inbalance.

Referring initially to FIG. 1, the rechargeable battery assembly 10 is formed of a number of individual cell units 10–1, 10–2, 10–3, 10–4 . . . 10–20. The particular number of individual cells serially connected in the overall rechargeable battery assembly 10 is determined by the intended load application, in the well known manner. The specific cells may be of the sealed nickel cadmium type, generally summarized in aforementioned copending U.S. patent application Ser. No. 373,216, the disclosure of which is herein relied upon to shorten the description of the novel system for recharging such battery cells, as is the subject of the present invention. The invention may, however, be utilized in conjunction with other types of rechargeable alkaline battery cells; for example, in nickel iron rechargeable cells.

For purposes of facilitating an analysis of the circuit, those components which are inserted for the discharge mode of operation are shown dotted, and do not serve any purpose during battery charging, as shown in FIGS. 1 and 3. The positive output terminal 12 of the battery assembly is shown connected by lead 14 to the positive terminal 16 of a constant potential D.C. source, generally shown as 20. Constant potential D.C. source 20 may be of any well known variety, such as a D.C. generator, or an A.C. generator and appropriate rectifying circuitry. The negative terminal 18 of the constant potential D.C. source 20 is connected via contacts B and A of single pole double-throw switch S–1 to the common junction 22 of: the collector terminal 34 of transistor 30, one end of resistor 35, and the anode of diode 60. The emitter terminal 32 of transistor 30 is then connected to common junction 47 which also includes the cathode terminals of diodes 60 and 45. Common junction 47 is, in turn, connected to one of the terminals 52 of the coulometer 50, the other terminal 54 thereof being connected to common junction 49 of the negative battery terminal 13 and the emitter terminal of transistor 40. The base terminal 36 of transistor 30 is connected to the common junction 38 of the transistor 40, collector terminal 44 and the other end of resistor 35. Base terminal 46 of transistor 40 is connected to the anode terminal of diode 45. Diode 60 and 62 are shown dotted in FIGS. 1 and 3, inasmuch as they are provided for the discharge mode of circuit operation, as shown in FIG. 4.

The initial charging path from the constant potential D.C. source 20 to the battery assembly 10 is along the series path indicated by the dotted arrow 90 of FIG. 1. That is, from positive terminal 16 of the constant potential D.C. source 20, along lead 14, to the positive terminal 12 of the battery assembly 10, through the battery assembly 10 to negative terminal 13, terminal 54 of the coulometer device 50, through the coulometer device 50 to terminal 52, the emitter-to-collector junction (32–34) of transistor 30, and returning through switch S–1 to the negative polarity terminal 18 of the constant potential D.C. source. As should be initially recognized at this point, inasmuch as the charging current path is serially through coulometer device 50, it will have an electrical charge input presented thereto, operatively related to the electrical charge input-to-battery assembly 10.

In order to appreciate the manner in which the coulometer, or charge totalizing means, 50 serves to control in accordance with the amount of charge presented from the constant potential source 20 to the battery assembly 10, reference is now made to FIG. 2 which shows the Output Voltage versus Charge relationship across the terminals 52, 54 of the coulometer device 50. As previously mentioned, coulometer 50 may typically be of the sealed electrochemical variety, of the general type which is the subject of copending U.S. patent application Ser. No. 373,217. Such an electrochemical coulometer cell typically includes a pair of reversible electrodes, such as cadmium (II) hydroxide $[Cd(OH)_2]$ and of metallic cadmium $[Cd]$, respectively. An external circuit passing current through the cell in one direction will convert or oxidize the cadmium of one of the electrodes into cadmium hydroxide as the cell current converts or reduces the cadmium hydroxide of the other electrode into cadmium. In such cells, as long as each of the electrodes contains both cadmium and cadmium hydroxide, the voltage between the cell electrode is quite low, typically in the order of 0.05 to 0.1 volt. However, when a definite quantity of electricity has passed through the cell, required to convert or oxidize all of the cadmium of one of the electrodes into cadmium hydroxide, and a change in the electrochemical process occurs at one or both of the electrodes, such as the onset of gas evolution, this change is accompanied by a substantial and abrupt change of the voltage between its electrodes, rising towards a value in the order of 1.5 volts. This value may be limited to a value in the order of 0.7 volt in order to avoid excessive gas pressure buildup. Because the plates are identical, electrochemical coulometer device 50 is reversible. As the chemical reaction proceeds in the opposite direction, the coulometer voltages displayed are negative, and after the same amount of charge has passed through the coulometer in the opposite direction the output voltage will experience a similar abrupt rise towards —1.5 volts. In accordance with our invention, the amount of charge which is required to produce the abrupt voltage response will be a predetermined quantity, operatively related to the predeterminedly selected charge input to the battery assembly 10.

The above-described operation of the coulometer device 50 is graphically displayed in FIG. 2. Point 70 corresponds to a substantially uncharged condition of the coulometer 50, wherein both the plates thereof contain an apprciable amount of both cadimium and cadmium hydroxide. As the charge input to the coulometer proceeds from the point 70 towards 72, both of the coulometer plates will still contain cadmium and cadmium hydroxide and the magnitude of the output voltage is fairly low and constant in the order of a maximum of 0.1 volt. Point 72 corresponds to a charge input in which the balance is substantially complete and a further charge input results in an abrupt change of output voltage, rising to a value of approximately 1.5 volts at point 76, thereby providing the electrical signal output which is utilized by the system of the instant invention to control the charging current. Advantageously, a charge current cutoff is provided at point 74 in order to avoid excessive gas pressure build-up within the coulometer cell 50.

Because of the symmetry of the device, the operation of the colometer cell 50 is reversible. That is, upon discharge of the battery cell assembly 10 into a load, the passage of current through the coulometer 50 will be in the opposite direction. During the initial discharge period, as indicated between points 82 and 84, the potential output of the coulometer device will have the same substantially low value as between points 70 and 72, but in the opposite direction. When the coulometer capacity has been reached, as indicated by the point 84, and corresponding to completion of imbalance between the coulometer plates, there will be a severe and abrupt rise of the coulometer output potential towards the point 86, preferably limited at 85.

Reference is now made additionally to FIG. 3 for illustrating the manner in which the electrical signal output across the terminals 52, 54 of coulmeter device 50 serves to switch the charging current between a first charging path 90 shown in FIG. 1 to a second charging path 97 shown in FIG. 3. During the initial portion of the charging cycle (between points 70 and 72, FIG. 2), the coulometer has a very small potential difference between its terminals (less than 0.1 volt); thus practically full potential between input source 20 and battery assembly 10 is seen between emitter 32 and collector terminal 34 of transistor 30. This potential difference may, however, be considered as including two components, that between the emitter 32 and base 36, and the base 36 and collector 34. The latter potential difference serves as a source of base current, as shown by the path 95, the magnitude of which is limited by resistor 35. Hence, transistor 30 will be in its appreciable conducting state, as shown in FIG. 1.

During this time transistor 40 will be cut off for the following reasons. The emitter 42 of transistor 40 is connected to the negative terminal of the battery assembly 10 at common junction 49, while the base 46 is connected through diode member 45 to the opposed terminal 52 of coulometer device 50; thus, the potential across the coulometer terminals 54–52 will be applied to the series connected path of diode 45 and the emitter-to-base junction of transistor 40. Transistor 40 is typically of a type which requires the order of 0.3 volt between its emitter-to-base junction, in order to go in its conduction state. Similarly, diode member 45 may be selected to require 0.6 volt across its terminals for it to conduct. Hence, transistor 40 will be cut off until the potential across coulometer terminals 54, 52 will approach a value in the order of 0.9 volt. Referring to FIG. 2, it is noted that this condition corresponds to the coulometer undergoing substantial and abrupt change of potential indicating that the desired definite quantity of electricity has passed therethrough.

FIG. 3 refers to the condition where the coulometer has provided the 0.9 volt electrical output signal, indicating that desired quantity of electrical charge input has been returned to the battery cell assembly 10. Transistor 40 will now be in its conducting state, with the charging current indicated by arrow 97 passing through the emitter-to-collector junction 42–44 of transistor member 40 and resistor 35. As transistor member 40 goes into its conducting state and contributes current to resistor 35, there will be a gradual decrease in the base current of transistor 30. As the base current of transistor 30 is reduced, the current through the emitter-to-collector path thereof is reduced to the point where transistor 30 is cut off and the principal charging path is then as shown in FIG. 3. It is noted that this charging path includes resistor 35. Resistor 35 is selected such that it is of a sufficient magnitude so that the rate of charging current through the charging path 97 is of a sufficiently low value so as not to excessively overcharge the cell over a long duration of time. This lower charging rate, which may provide a topping charge to the battery cell assembly 10, may typically be in the order of one-tenth the ampere hour capacity of the battery asembly 10 (the value typically provided by a constant current charging source).

Thus, in essence, what we provide is a constant potential charging source, in which the charging rate is initially determined by the back E.M.F. of the battery cell assembly and the internal resistance of the cell assembly. After the battery reaches a predetermined charge capacity, as determined by the coulometer potential, the charge path is converted to an essentially constant current charger at a much lower charging rate.

FIGURE 4 graphically shows the manner in which the charging current is controlled in accordance with the above-described circuits. Intermediate the points 110 and 112, the charging current path will be through path 90, as shown in FIG. 1. This will be an initially high value, gradually decreasing as the back E.M.F. of the battery assembly 10 increases. At point 112 the coulometer provides its electrical output signal, thereby switching to the charge path 97 shown in FIG. 3 and abruptly changing the charging current to the much lower substantially constant current rate as indicated commencing at the point 114.

FIG. 5 represents the discharge current path, which may be provided for the battery cell assembly 10 into load 100. The contacts of switch S–1 are moved such that the common terminal A is now connected to terminal C connected to the load 100. Diode 60 serves as a shunt path across transistor 30 during discharge and diode 62 serves as a protective shunt across the coulometer device 50. Thus, the discharge path from battery assembly 10 to the load 100 is as follows. From the battery terminal 12, along lead 14, through load 100, across the contacts C–A of switch S–1, to junction 22, through shunt diode 60, to junction 47, through coulometer device 50 (in the opposite direction as the charging current passes through the coulometer shown in FIGS. 1 and 3), and returning to the opposite terminal 13 of the battery assembly. It is thus noted that the discharge path for the battery into the external load includes the coulometer circuit connected in a manner such that the current flow therethrough during battery discharge is opposite to the current flow therethrough during battery charge, and the coulometer will therefore have its charge condition vary in accordance with the battery charge condition. Should the battery continue to discharge to an excessive discharge condition, there will be a tendency of the coulometer to evolve excessive gases as its potential increases above a value in the order of 0.6 volt, as shown at point 85 in FIG. 2. Diode 62, which is of the type requiring approximately 0.6 of a voltage drop to commence conducting, serves as a protective shunt across the coulometer so as to prevent such a condition of excessive gaseous pressure buildup therein.

Favorable results have been obtained utilizing a circuit of the FIGS. 1, 3 and 4, having the following parameters. It should be understood, however, that these parameters are merely given for illustrative purposes, and are in no means intended as a limitation of the scope of our invention.

| | |
|---|---|
| Battery assembly 10 | A series connection of 20 individual NiCd cells. |
| Constant potential D.C. source 20 | 30 volts. |
| Transistor 30 | 2N3613. |
| Transistor 40 | 2N1303. |
| Diode 45 | 1N461. |
| Diodes 60, 62 | IN3491. |
| Resistor 35 | 33 ohms, ½ watt. |

It should be understood that a complementary circuit may be provided using NPN transistor types.

As noted previously, the cyclic operation of our circuit requires that the charge condition of coulometer 50 be operatively related at all times to the charge or discharge condition of the battery cell assembly 10. This is provided by including the coulometer 50 in both the series charge and discharge circuit of the battery. However, it is known that the charging efficiency of the coulometer device is very close to 100%. However, the charging efficiency of the battery cell assembly 10, which requires a certain amount of overcharge each time in order to provide 100% capacity, will be less than 100%. Compensation for this difference in efficiency may be achieved by the coulometer bypass circuit of FIG. 6. More specifically, a bypass circuit is provided through resistor 122 and transistor 120 such that a portion of the main charging current flowing through the battery assembly 10 will not flow through coulometer device 50. Considering the operation of this bypass circuit, during the passage of the main charging current as shown in FIG. 1, there will be a sufficient voltage drop across diode 125 such that transistor 120 will be conducting and a current path therethrough will bypass coulometer 50. Resistor 122 is selected to give a current magnitude related to the desired bypass, in accordance with the difference of efficiency between coulometer 50 and battery cell assembly 10. As the charging progresses and the coulometer 50 increases in potential, the charging current path is switched to that shown in FIG. 3, and the current flow will then be interrupted through both the coulometer 50 and the bypass transistor 120. Diodes 60' and 127 are provided for the discharge circuit.

FIG. 7 shows a modified circuit arrangement in accordance with our invention and including a protective arrangement for limiting the initial charging current should the potential of source 20 increase or should some of the individual cells within battery assembly 10 be shorted or otherwise damaged. This circuit operates essentially in the same manner of FIG. 1 in switching between the high and low charging rates, and circuit elements performing corresponding functions are indicated by prime numerals. The series connected diodes 130, 132, 134 provide an essentially constant voltage source. Thus, the potential seen between the base-to-emitter junction of NPN transistor 140 is equal to this constant voltage less the potential across resistor 138. Should the magnitude of constant potential source be increased or one of the cells of battery assembly 10' be shorted, the charging current through the emitter to collector junction of transistor 30' will tend to show a corresponding increase. Such an increase will tend to cause a corresponding increase in the base current 150, thereby increasing the potential drop across base resistor 138. However, as the potential across resistor 138 is increased, the potential across the base-to-emitter junction of transistor 140 will decrease, thereby serving to limit the current between its collector to emitter terminals, and hence the base current of transistor 30', which in turn will serve to limit the main charging current between the emitter to collector terminals of transistor 30'. When the coulometer provides its electrical output signals for switching the conduction between transistors 30' and 40', the discharge current path will then include resistor 152 which serves a current limiting function, similar to 35 of FIG. 3.

It is therefore seen that our invention provides an improved battery charging system for operation in conjunction with a constant potential charging source, and wherein the rate of charge is controlled in accordance with the charge condition of the battery.

In the foregoing, the invention has been described in conjunction with preferred illustrative embodiments. Since many variations will now become obvious to those skilled in the art, it is accordingly desired that the breadth of the claims not be limited to the specific disclosure herein contained.

The embodiments of the invention in which an exclusive privliege or property is claimed are defined as follows.

1. In a system for recharging a battery with opposite polarity poles from a source of electrical energy, a charge totalizing means circuit connected in the charging path of said battery and source for receiving an electrical charge input from said source, operatively related to the quantity of electrical charge input delivered by said source to said battery, said charge totalizing means characterized as presenting an electrical signal output when the charge input presented thereto reaches a predetermined quantity, operatively related to a predeterminedly selected charge input to said battery, electronic circuit means responsive to said electrical signal output for appreciably reducing the rate of input charge provided by said source, such that said battery will receive an initial charge from said source at a first rate and upon the presentation of said electrical signal output thereafter receive a charge at an appreciably reduced second rate, with the switching between said first and second rates being responsive to the charge input to said battery as determined by the charge condition of said charge totalizing means, said electronic circuit means including first and second transistor and a current limiting means;

a first charging path from said source including said first transistor, charge totalizing means and battery, and a second charging path from said source including said second transistor, current limiting means and battery;

said first transistor being in its appreciable conducting state and said second transistor being cut off at times corresponding to the absence of said electrical signal output; and said second transistor being in its appreciable conducting state and said first transistor being cut off at times corresponding to the presence of said electrical signal output;

such that the battery charge path from said source is through said first charging path at said first rate before the charge input to said charge totalizing means reaches said first predetermined quantity, and is thereafter through said second charging path at said second rate when the charge input to said charge totalizing means reaches said predetermined quantity.

2. In a system for recharging a battery, as set forth in claim 1:

said charge totalizing means being an electrochemical coulometer having a pair of output terminals;

said coulometer characterized as having a low, substantially constant, potential output between said terminals, corresponding to an electrical charge input which is less than said predetermined quantity, and upon the reaching of said predetermined quantity exhibiting an abrupt increase of output potential, with said abrupt potential change providing said electrical signal output.

3. In a system for recharging a battery, as set forth in claim 1:

said current limiting means designed to limit the second rate of charging current through said second charging path to a value in the order of $C/10$, where C is the ampere hour capacity of the battery.

4. In a system for recharging a battery, as set forth in claim 2:

said current limiting means designed to limit the second rate of charging current through said second charging path to a value in the order of $C/10$, where C is the ampere hour capacity of the battery.

5. In a system for recharging a battery, as set forth in claim 2:

further including protective circuit means for controlling the magnitude of said first current rate through said first charging path, said protective circuit means in the base bias path of said first transistor, and serving to control the charging current through said first transistor, in accordance with system conditions sensed by said protective circuit means.

6. In a system for recharging a battery, as set forth in claim 5:

said protective circuit means operatively responsive to variations of the magnitude of potential provided by said source, for limiting the initial charge current through said first charging path responsive to an increase of the source potential magnitude.

7. In a system for recharging a battery, as set forth in claim 1; further including:

a discharge path for said battery into an external load, said discharge path including said charge totalizer means circuit connected in a manner such that the current flow therethrough during battery discharge is opposite to the current flow therethrough during battery charge, and said charge totalizer means will have its charged condition vary in accordance with the battery charge condition.

8. In a system for recharging a battery, as set forth in claim 2, further including:

a discharge path for said battery into an external load, said discharge path including said coulometer circuit connected in a manner such that the current flow therethrough during battery discharge is opposite to the current flow therethrough during battery charge, and said coulometer will have its charged condition vary in accordance with the battery charge condition.

9. In a system for recharging a battery, as set forth in claim 8:

said discharge path including a protective diode shunt connected across said coulometer for preventing the reverse potential across said coulometer from exceeding a predetermined value.

10. In a system for recharging a battery, as set forth in claim 8:

said coulometer characterized as having a higher charge-discharge efficiency than said battery, the charging path of said battery including circuit means for bypassing a predetermined portion of the charging current from said coulometer in a manner compensating for the efficiency difference between said coulometer and battery.

11. In a system for recharging a battery, as set forth in claim 1:

said battery being of the sealed alkaline variety and characterized as having an output voltage across its opposite polarity poles directly related to charge condition and inversely related to temperature of the battery.

12. In a system for recharging a sealed alkaline battery with opposite polarity poles from a constant potential source having a pair of opposite polarity terminals, a charging circuit including an electrochemical coulometer having a pair of output terminals, said coulometer characterized as having a low, substantially constant, potential output between said terminals corresponding to an electrical charge input which is less than a predetermined quantity and upon the reaching of said predetermined quantity exhibiting an abrupt increase of output potential; terminal;

said predetermined quantity operatively related to a predeterminedly selected desired charge input to said battery;

said charging circuit including a first and second transistor, each including an emitter, collector and a base terminal;

a first charging path between said source terminals and battery, including said coulometer, and the emitter-to-collector junction of said first transistor, and a second charging path between said source terminals and battery, including the emitter-to-collector junction of said second transistor, and a current limiting means;

the potential across said coulometer output terminals being circuit connected to said transistor terminals, such that said first transistor is in its appreciable conducting state and said second transistor is cut-off when the coluometer potential is at its low value, and said second transistor is in its appreciable conducting state and said first transistor is cut-off when said coulometer potential is abruptly increased, such that the charge controlled coulometer potential switches the battery charging circuit between said first and second charging paths, and said current limiting means limits the charging current through said second charging path to a value which may safely be presented to the battery for a prolonged time interval.

13. In a system for recharging a sealed alkaline battery, as set forth in claim 12:

said current limiting means designed to limit the rate of charging current through said second charging path to a value in the order of $C/10$, where C is the ampere hour capacity of the battery.

References Cited

UNITED STATES PATENTS 3,302,091  1/1967  Henderson.

LEE T. HIX, *Primary Examiner.*

S. WEINBERG, *Assistant Examiner.*

U.S. Cl. X.R.

320—39, 50